United States Patent [19]

Harris

[11] Patent Number: 5,883,802
[45] Date of Patent: Mar. 16, 1999

[54] ENERGY USAGE CONTROLLER FOR AN APPLIANCE

[75] Inventor: Robert D. Harris, Oshkosh, Wis.

[73] Assignee: Alliance Laundry Systems LLC, Ripon, Wis.

[21] Appl. No.: 774,238

[22] Filed: Dec. 27, 1996

[51] Int. Cl.$^6$ ................................................ G05B 13/02
[52] U.S. Cl. ............................ 364/148.01; 364/140.05; 364/140.1; 364/483; 364/481
[58] Field of Search ................................ 364/148, 140, 364/464.04, 465, 466, 483, 468.04, 550; 318/799, 103; 139/18, 56, 25.2, 57 D; 68/12.01, 12.02, 12.07, 12.27, 12.12, 12.21

[56] References Cited

U.S. PATENT DOCUMENTS

| | | | |
|---|---|---|---|
| 4,305,122 | 12/1981 | Smith et al. | 364/144 |
| 4,695,738 | 9/1987 | Wilmot | 307/31 |
| 4,735,219 | 4/1988 | Seeland | 134/56 R |
| 4,924,404 | 5/1990 | Reinke, Jr. | 364/464.04 |
| 5,166,592 | 11/1992 | Bashark | 318/799 |
| 5,193,292 | 3/1993 | Hart et al. | 34/30 |
| 5,365,154 | 11/1994 | Schneider et al. | 318/103 |
| 5,438,507 | 8/1995 | Kim et al. | 364/140 |
| 5,560,060 | 10/1996 | Dausch et al. | 8/158 |
| 5,560,124 | 10/1996 | Hart et al. | 34/493 |
| 5,577,283 | 11/1996 | Badami et al. | 8/158 |
| 5,611,867 | 3/1997 | Cooper et al. | 134/18 |

*Primary Examiner*—Paul P. Gordon
*Assistant Examiner*—Ramesh Patel
*Attorney, Agent, or Firm*—Marshall, O'Toole, Gerstein, Murray & Borun

[57] ABSTRACT

A controller controls the energy of an appliance during a current selected cycle in order to ensure that the energy usage is maintained below a predetermined average limit. The controller maintains the appliance's energy usage below the predetermined average limit by responding to an estimate of an expected average use. The expected average energy use is based on energy expected to be used by the appliance during the current selected cycle and stored energy use of the appliance during past selected cycles.

28 Claims, 3 Drawing Sheets

ENERGY USAGE CONTROLLER FOR AN APPLIANCE

TECHNICAL FIELD OF THE INVENTION

The present invention is directed to an energy controlled appliance such as a clothes washer, a dish washer, a dryer, or the like.

BACKGROUND OF THE INVENTION

Guidelines have been promulgated by government and/or industry organizations regulating the maximum energy consumption levels of appliances such as dish washers, clothes washers, dryers, and the like. According to these guidelines, the average energy usage over a predetermined number of cycles of operation of such appliances should not exceed a defined acceptable maximum energy consumption level.

The U.S. Department of Energy, for example, has established an energy factor (EF) which is computed in order to determine energy usage of an appliance. The calculation of the energy factor is based on several inputs, including the temperatures available for selection by a user, estimated probabilities that these temperatures will be selected, the volume of the appliance container into which the articles to be washed and/or dried are placed, fill level in the container, motor energy, and the like.

For example, the energy factor EF for a clothes washer is calculated by multiplying the following factors: (i) the volume V (e.g., in terms of gallons) of water used during a cycle; (ii) a clothes density adjustment factor D (such as 0.94); (iii) the temperature T (e.g., in degrees Fahrenheit) of the water; and, (iv) a constant K which relates power usage to volume and temperature. The quantity 0.0024 kWh/(Gal.)(° F.), for example, may be used for the constant K. Thus, the energy factor EF is determined according to the following equation:

$$EF=(V)(D)(T)(K). \qquad (1)$$

It should be noted that a cycle of operation or cycle as used herein means the operation of the appliance from the time that the appliance turns on to begin the processing of a load until the appliance turns off following the complete processing of that load. A cycle may be divided into a number of subcycles. For example, a cycle of a dish washer may include one or more wash subcycles, one or more rinse subcycles, a drying subcycle, and the like. It should also be noted that, if the metric system is used for the units of V and T, the magnitude of K should be changed accordingly.

New standards are expected to be implemented which may require even higher efficiency standards. Accordingly, the acceptable maximum energy consumption level is expected to decrease. In terms of a washing machine, the acceptable energy consumption level directly affects the amount of hot water usage per cycle. Additionally, credits may be used to adjust the calculated energy factor for an appliance if the appliance implements certain energy saving operations. For example, if a clothes washer provides higher spin speeds suitable for obtaining greater water extraction, the higher spin speed thereby reduces the energy requirements of a dryer. Accordingly, an energy credit would be given to the clothes washer if it implements higher spin speeds.

The present invention is directed to an appliance controller that is flexible enough to comply with changing requirements regulating maximum energy usage.

SUMMARY OF THE INVENTION

According to a first aspect of the present invention, a controller for controlling an appliance during a current selected cycle comprises an estimating means, a controlling means, and a storing means. The estimating means estimates an expected average energy quantity based on energy expected to be used by the appliance during the current selected cycle and on energy usage of the appliance during designated past selected cycles. The controlling means is responsive to the estimating means and controls the appliance during the current selected cycle. The storing means stores energy usage of the appliance during the current selected cycle with energy usage of the appliance during past selected cycles.

According to another aspect of the present invention, a controller for controlling an appliance during a current selected cycle comprises first and second estimating means, a comparing means, a controlling means, a determining means, and a storing means. The first estimating means estimates an expected energy amount related to energy expected to be used by the appliance during the current selected cycle. The second estimating means estimates an expected average energy amount based on the expected energy amount and upon energy amounts related to energy usage during past selected cycles. The comparing means compares the expected average energy amount to a predetermined level. The controlling means is responsive to the comparing means and controls the appliance during the current selected cycle.

The determining means determines an energy amount dependent upon energy used by the appliance during the current selected cycle. The storing means stores the energy amount determined by the determining means with energy amounts related to past selected cycles.

According to yet another aspect of the present invention, a method of controlling an appliance during a current selected cycle C comprising the following steps: a) estimating expected non-electrical energy to be used by the appliance during the current selected cycle; b) estimating expected electrical energy to be used by the appliance during the current selected cycle; c) estimating an expected average energy based on the expected non-electrical energy, the expected electrical energy, and energy substantially related to past selected cycles C–N, C–N+1, ... C–1; d) comparing the expected average energy to a predetermined level; e) controlling the appliance during the current selected cycle responsive to the comparison of the expected average energy to the predetermined level; f) determining operating non-electrical energy used by the appliance during the current selected cycle; g) determining operating electrical energy used by the appliance during the current selected cycle; h) storing an energy amount based upon the operating non-electrical energy and the operating electrical energy with energy amounts related to past selected cycles; and i) repeating steps a) through h) during a future selected cycle.

BRIEF DESCRIPTION OF THE DRAWINGS

These and other features and advantages of the present invention will become more apparent from a detailed consideration of the invention when taken in conjunction with the drawings in which.

DETAILED DESCRIPTION

Figure 1:
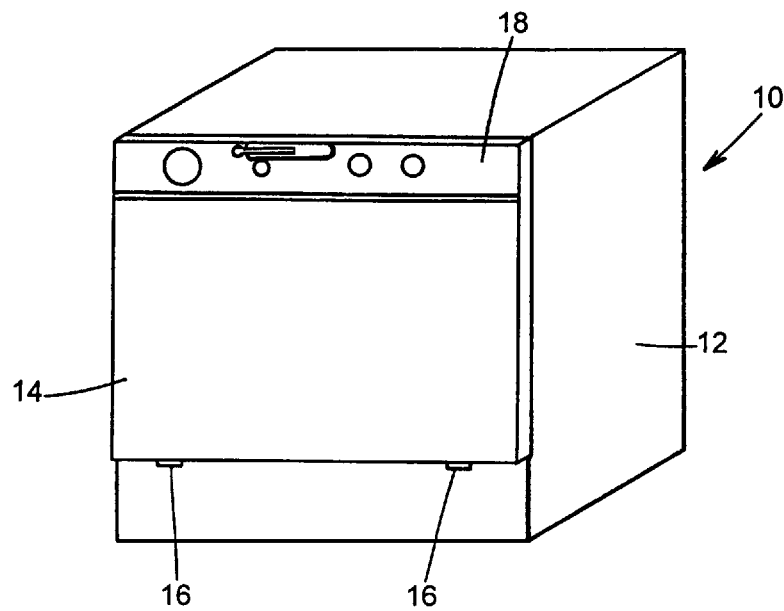
FIG. 1 is an isometric view of an energy controlled dish washer according to the present invention.

A dish washer 10 is illustrated in FIG. 1 and has a cabinet 12 and a door 14. The door 14 pivots down around hinges 16 in order to provide access to a dish compartment of the cabinet 12 within which dishes may be inserted for washing, rinsing, and/or drying. The door 14 includes a control panel 18 which houses various controls as will be described hereinafter. Also, the cabinet 12 houses the various motors, valves, and the like which cooperate with the controls contained in the control panel 18 for operating the dish washer 10 through its various cycles.

Figure 2:
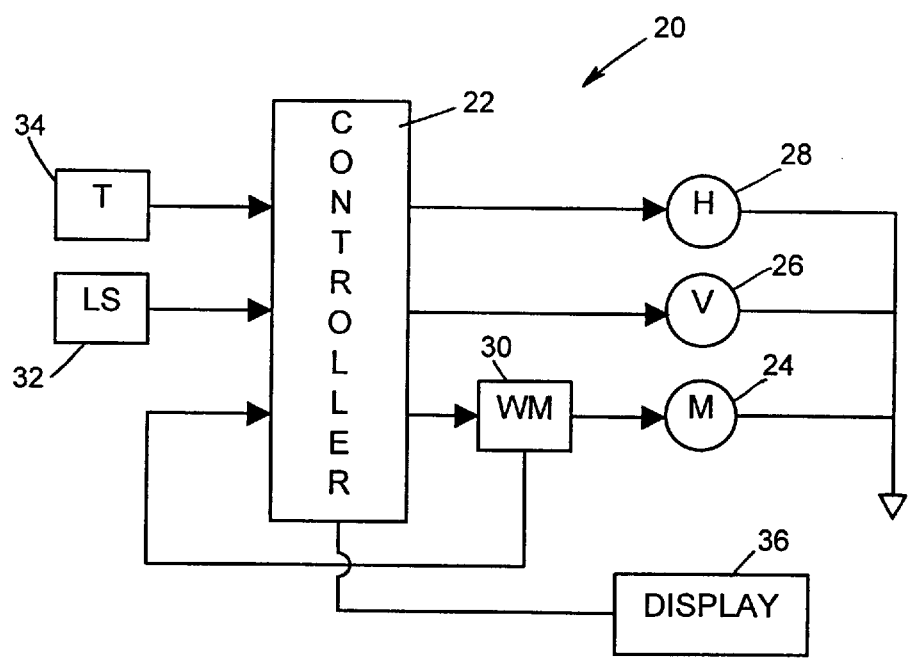
FIG. 2 is a schematic diagram of a controller, including a computer, for the energy controlled dish washer of FIG. 1; and, FIGS. 3 and 4 are flow charts of a program which may be executed by the computer of the controller shown in FIG. 2 in order to control the energy controlled dish washer shown in FIG. 1.

FIG. 2 illustrates a control system 20 which may be contained within the cabinet 12 and the control panel 18 of the dish washer 10 and which controls the operation of the dish washer 10 according to the principles of the present invention. The control system 20 includes a controller 22, which may be a computer, such as a microprocessor, or the like. The controller 22 responds to certain inputs and/or selections by a user in order to control certain output devices such as a motor 24, a valve 26, and a heater 28.

Specifically, the controller 22 controls the motor 24 in order to drive a pump which pumps wash water and rinse water up through agitators that spray the wash water and the rinse water over the dishes being cleansed by the dish washer 10. The controller 22 controls the valve 26 which in turn controls the supply of wash water and rinse water to the dish compartment of the cabinet 12. The controller 22 also controls the heater 28 which, when energized, heats the wash water and/or rinse water supplied to the dish compartment of the cabinet 12 of the dish washer 10 under control of the valve 26. The controller 22 may also control other devices such as a soap dispenser (not shown).

As will be discussed below, the controller 22 determines the amount of energy used by the dish washer 10 during each cycle of operation and stores data related to that amount of energy in order to control future cycles of the dish washer 10. This energy related data may be determined based on stored predetermined energy values related to known temperatures, water volumes, and heater and motor energy requirements for each of the possible cycles that may be selected by the user. Accordingly, when a user selects a cycle which calls for one or more predetermined volumes of wash water, one or more predetermined volumes of rinse water, one or more temperatures related to the one or more volumes of wash water and rinse water, and total run times of the motor 24 and the heater 28, the controller 22 may use the selected cycle as an address into a look up table in order to determine the energy requirements of the dish washer 10 for the selected cycle.

Alternatively, the energy related data may be determined based on measured temperatures, water volumes, and motor energy consumption, or based on a combination of measured values and prestored values. Accordingly, a watt meter 30 may be inserted into the circuit of the motor 24 in order to measure energy usage of the motor 24 during its operation. The watt meter 30 may form an input to the controller 22. A level sensor 32 may sense the level of water in the dish washer 10 and may form another input to the controller 22. Instead of employing the level sensor 32 to sense the level of water in the dish washer 10, a flow sensor may be used to sense the amount of water flowing into the dish washer 10. Based upon this measured level or flow and the known geometry of the dish compartment of the cabinet 12, the controller 22 may determine the volume of water supplied to the dish compartment of the cabinet 12 by the valve 26. A temperature sensor 34 may sense the temperature of the wash water and rinse water during the operation of the dish washer 10. The temperature sensor 34 may also sense the temperature within the cabinet 12 during a drying cycle in order to determine energy consumption of the heater 28. Instead, however, a watt meter may be used to determine power consumption of the heater 28. For example, the watt meter 30 may be connected to a common output of the motor 24 and the heater 28 so as to measure power consumption of both the motor 24 and the heater 28.

Alternatively, instead of sensing temperature using the temperature sensor 34, the temperature of the wash water and rinse water during the operation of the dish washer 10 instead may be assumed. For example, for those appliances that allow the user to select hot and/or cold water, the temperature of the wash water and rinse water may be assumed based upon whether the user selects cold water, hot water, or a combination of cold and hot water; and, for those appliances that do not allow the user to select hot and/or cold water, the temperature of the wash water and rinse water may be assumed based upon whether the appliance is connected to a cold water line or to a hot water line.

Figure 3:
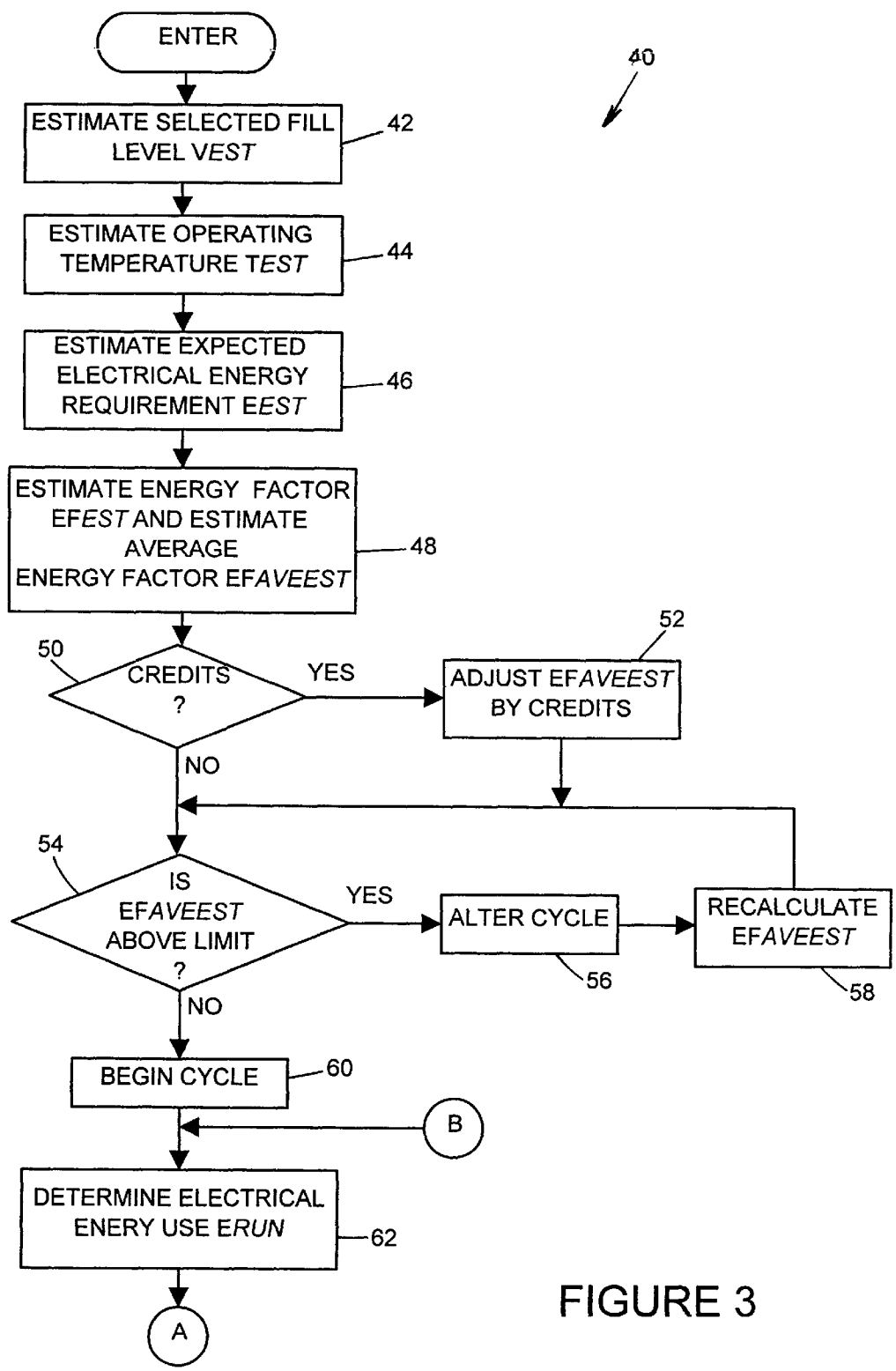
Figure 4:
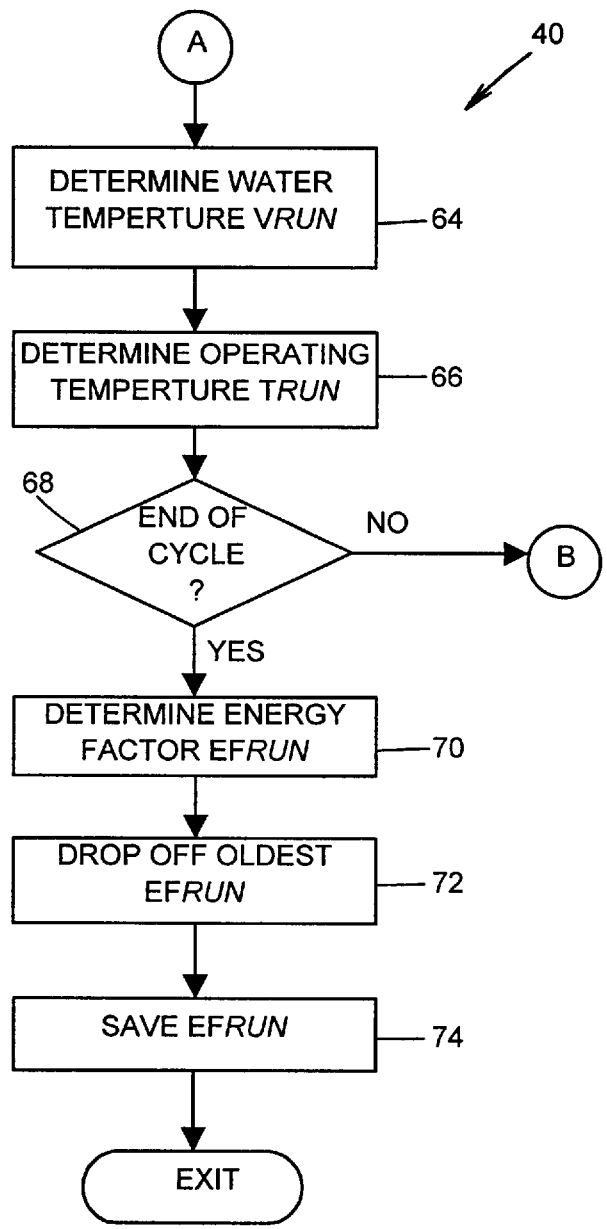

FIGS. 3 and 4 illustrate a program 40 which is executed by the controller 22 in order to control the dish washer 10 so that its average energy usage is maintained below a predetermined average limit. When the program 40 is entered at the beginning of a current selected cycle, a block 42 estimates the volume $V_{EST}$ of water to be used during the current selected cycle, a block 46 estimates the operating temperature $T_{EST}$ during the current selected cycle, and a block 44 estimates the electrical energy requirement $E_{EST}$ of the dish washer 10 during the current selected cycle. Because the motor 24 and the heater 28 of the dishwater 10 are the predominant electrical energy consumers of the dish washer 10, the expected electrical energy requirement $E_{EST}$ estimated by the block 46 may be based on expected electrical energy requirements of the motor 24 and the heater 28. The estimated volume $V_{EST}$, the estimated operating temperature $T_{EST}$, and the estimated electrical energy requirement $E_{EST}$ are based upon the current cycle of operation for the dish washer 10 selected by the user. For example, the current selected cycle may be used as an address into volume, temperature, and electrical tables stored in a memory of the controller 22 in order to retrieve the estimated volume $V_{EST}$, the estimated operating temperature $T_{EST}$, and the estimated electrical energy requirement $E_{EST}$.

A block 48 calculates the estimated energy factor $EF_{EST}$ based upon the estimated volume $V_{EST}$, the estimated operating temperature $T_{EST}$, and the estimated electrical energy requirement $E_{EST}$. For example, the block 48 may calculate the estimated energy factor $EF_{EST}$ based upon the estimated volume $V_{EST}$, the estimated operating temperature $T_{EST}$, and the estimated electrical energy requirement $E_{EST}$ using equation (1) above. Alternatively, the block 48 may determine the estimated energy factor $EF_{EST}$ from a look up table which prestores a value of an estimated energy factor $EF_{EST}$ based upon each cycle that may be selected by the user. If so, when a current cycle is selected by the user, the block 48 merely retrieves the stored estimated energy factor $EF_{EST}$ corresponding to the current selected cycle from the appropriate look up table. If this look up table arrangement is implemented, the blocks 42, 44, and 46 are unnecessary.

The block 48 also estimates the average energy factor $EF_{AVE}$ based upon (i) the estimated energy factor $EF_{EST}$ for the selected cycle and (ii) energy use related to each of a predetermined number of past selected cycles. If C designates the current selected cycle and N designates the predetermined number of past selected cycles, the past selected cycles may be designated as cycles C–N, C–N+1, . . . C–1. As indicated by these designations, these past selected cycles are those cycles immediately preceding the current selected cycle C. However, different combinations of past cycles may be implemented by the present invention.

If $E_{C-N}$ designates the energy related to the past selected cycle C–N, if $E_{C-N+1}$ designates the energy related to the past selected cycle C–N+1, . . . if $E_{C-1}$ designates the energy related to the past selected cycle C–1, and if $E_{EST}$ designates the energy estimated for the current selected cycle C as indicated above, the block 48 may determine an estimated average energy factor $EF_{AVEEST}$ (also referred to as expected average energy quantity) according to the following equation:

$$EF_{AVEEST} = \frac{(E_{C-N} + E_{C-N+1} + \ldots + E_{C-1} + E_{EST})}{N+1}. \quad (2)$$

A block 50 determines whether any energy credits are available to the dish washer 10. If so, a block 52 adjusts the estimated average energy factor $EF_{AVEEST}$ according to these credits. Alternatively, the credits may be arranged so that the energy factor $EF_{EST}$ may be adjusted by these credits before determination of the estimated average energy factor $EF_{AVEEST}$.

A block 54 compares the estimated average energy factor $EF_{AVEEST}$, which has been adjusted by credits, if applicable, to a limit. If the estimated average energy factor $EF_{AVEEST}$ is above the limit, a block 56 causes the current cycle selected by the user to be altered. For example, the block 56 may lower the wash and/or rinse water temperature during the current selected cycle of the dish washer 10. Alternatively, the block 56 may notify the user, through a display 36 (FIG. 2), either that another lower energy using cycle should be selected, or that the current selected cycle should be modified in order to reduce energy usage. After the block 56 has caused the selected cycle to be altered, a block 58 recalculates the estimated average energy factor $EF_{AVEEST}$ according to equation (2), and the block 54 compares the recalculated estimated average energy factor $EF_{AVEEST}$ to the limit. Once the estimated average energy factor $EF_{AVEEST}$ is at or below the limit, a block 60 causes the current selected (and adjusted, if appropriate) cycle to be initiated.

If the watt meter 30 is used in order to determine the electrical usage of the motor 24 (and of the heater 28), a block 62 reads the watt meter 30 during the current selected cycle. If the level sensor 32 is used to determine the amount of wash and/or rinse water in the dish washer 10, a block 64 reads the level sensed by the level sensor 32 during the current selected cycle and translates this level to volume. If a flow sensor is used to determine the amount of wash and/or rinse water in the dish washer 10, the block 64 reads the amount of flow sensed by the flow sensor during the current selected cycle and translates this flow to volume. If the temperature sensor 34 is used to determine the temperature of the wash and/or rinse water in the dish washer 10, a block 62 reads the maximum operating temperature during the current selected cycle. If the temperature sensor 34 is not used to determine the temperature of the wash and/or rinse water in the dish washer 10, a block 62 retrieves an assumed temperature from memory. This temperature may be assumed as described above.

A block 68 determines whether or not the current selected cycle has ended. If not, the blocks 62 through 66 continue to read their associated sensors. Upon the end of the current selected cycle, a block 70 determines (i) the volume $V_{RUN}$ of water which was used during the current selected cycle, (ii) the operating temperature $T_{RUN}$ within the dish compartment of the cabinet 12 during the current selected cycle, and (iii) the electrical energy $E_{RUN}$ used by the dish washer 10 during the current selected cycle. The block 70 may determine the operating temperature $T_{RUN}$ as a time weighted average of each operating temperature read by the block 66. The block 70 determines the energy factor $EF_{RUN}$ based upon $V_{RUN}$, $T_{RUN}$ and $E_{RUN}$ according to the equation (1). Alternatively, if two or more subcycles (e.g., an individual wash or rinse subcycle) of the current selected cycle have different operating temperatures, an energy factor for each such subcycle may be determined based on each different corresponding operating temperature, and the energy factors for all subcycles of the current selected cycle can be added together in order to determine the overall energy factor $EF_{RUN}$ for the current selected cycle.

A block 72 deletes the oldest $EF_{RUN}$ which was used by the block 48 to calculate the estimated average energy factor $EF_{AVEEST}$ as described above. For example, the block 72 deletes the energy amount $E_{C-N}$ related to the past cycle C–N because this energy amount $E_{C-N}$ was used to calculate the estimated average energy factor $EF_{AVEEST}$ and because, of the energy amounts used to calculate $EF_{AVEEST}$, the energy amount $E_{C-N}$ relates to the oldest past cycle that occurred before the current selected cycle. A block 74 saves the newest energy factor $EF_{RUN}$, which was determined by the block 70, so that this newest energy factor $EF_{RUN}$ may be used by the block 48 in order to determine the average energy factor $EF_{AVEEST}$ for a future selected cycle. For example, the block 74 saves this newest energy factor $EF_{RUN}$ as the energy amount $E_{C-1}$ related to the past cycle C–1, and adjusts the other energy amounts related to past cycles accordingly. Thus, the block 74 saves the energy factor related to past cycle C–1 as the energy amount $E_{C-2}$, the block 74 saves the energy factor related to past cycle C–2 as the energy amount $E_{C-3}$, . . . .

Alternatively, if the watt meter 30, the level sensor 32, and the temperature sensor 34 are not used to determine the energy factor of the dish washer 10 during a selected cycle, and if this energy factor is instead determined based on stored predetermined energy values related to known temperatures, water volumes, and heater and motor energy requirements for each of the possible cycles that may be selected by the user, the blocks 62, 64, and 66 may be moved to between the block 68 and the block 70 and may be changed to simply retrieve the quantities $E_{RUN}$, $V_{RUN}$, and $T_{RUN}$ from storage. Accordingly, when a user selects a cycle which calls for one or more predetermined volumes of wash water, one or more predetermined volumes of rinse water, one or more temperatures related to the one or more volumes of wash water and rinse water, and total run times of the motor 24 and the heater 28, the controller 22 may use the selected cycle as an address into a look up table in order to retrieve the quantities $E_{RUN}$, $V_{RUN}$, and $T_{RUN}$ for the selected cycle. The block 70 then determines the energy factor $EF_{RUN}$ based upon the retrieved quantity $V_{RUN}$, the retrieved quantity $T_{RUN}$, and the retrieved quantity $E_{RUN}$ according to the equation (1).

As a further alternative, instead of determining or retrieving the quantities $E_{RUN}$, $V_{RUN}$, and $T_{RUN}$ as discussed above in order to determine the energy factor $EF_{RUN}$, the energy factor $EF_{RUN}$ may itself be retrieved by the block 70 from a lookup table using the current selected cycle as an address thereto. In this case, the blocks 62, 64, and 66 may be eliminated altogether.

Certain modifications of the present invention have been discussed above. Other modifications will occur to those practicing in the art of the present invention. For example, as described above, the present invention involves the control of a current selected cycle based on energy usage estimated for the current selected cycle and energy usage of the selected cycles. Instead, the current selected cycle may be controlled based upon energy usage estimated for one or more subcycles of the current selected cycle and energy usage of one or more subcycles of past selected cycles.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A controller for controlling an appliance during a current selected cycle comprising:

estimating means for estimating an expected average energy quantity based on (i) energy expected to be used by the appliance during the current selected cycle, and (ii) energy usage of the appliance during designated past selected cycles;

controlling means responsive to the estimating means for controlling the energy usage of the appliance during the current selected cycle; and, storing means for storing energy usage of the appliance during the current selected cycle with energy usage of the appliance during past selected cycles.

2. The controller of claim 1 wherein the designated as selected cycle is current cycle C, and wherein the designated past selected cycles are past cycle C−N, past cycle C−N+1, past cycle C−N+2, . . . and past cycle C−1.

3. The controller of claim 2 wherein the storing means stores energy usage of the appliance during the current selected cycle C with energy usage of the appliance during past cycle C−N+1, past cycle C−N+2, . . . and past cycle C−1.

4. The controller of claim 3 wherein the storing means deletes from memory energy usage of the appliance during past cycle C−N.

5. The controller of claim 3 wherein the estimating means estimates the expected average energy based on (i) energy expected to be used by the appliance during the current selected cycle, (ii) energy usage of the appliance during the designated past cycles, and (iii) an energy credit for an energy saving feature of the appliance.

6. The controller of claim 5 wherein the storing means deletes from memory energy usage of the appliance during past cycle C−N.

7. The controller of claim 3 wherein the controlling means comprises comparing means for comparing the expected average energy to a predetermined level, and wherein the controlling means controls the appliance responsive to the comparing means.

8. The controller of claim 7 wherein the controlling means energizes the appliance when the expected average energy is below the predetermined level.

9. The controller of claim 7 wherein the estimating means estimates the expected average energy additionally based on (iii) an energy credit for an energy saving feature of the appliance.

10. The controller of claim 1 wherein the estimating means estimates the expected average energy additionally based on (iii) an energy credit for an energy saving feature of the appliance.

11. A controller for controlling an appliance during a current selected cycle comprising:

first estimating means for estimating an expected energy amount expected to be used by the appliance during the current selected cycle;

second estimating means for estimating an expected average amount based on (i) the expected energy amount and (ii) energy amounts related to energy usage during past selected cycles;

comparing means for comparing the expected average energy amount to a predetermined level;

controlling means responsive to the comparing means for controlling the energy usage of the appliance during the current selected cycle;

determining means for determining an energy amount dependent upon energy used by the appliance during the current selected cycle; and, storing means for storing the energy amount determined by the determining means with energy amounts related to past selected cycles.

12. The controller of claim 11 wherein the current selected cycle is designated as cycle C, and wherein the past selected cycles are past cycle C−N, past cycle C−N+1, past cycle C−N+2, . . . and past cycle C−1.

13. The controller of claim 12 wherein the storing means stores energy usage of the appliance during the current selected cycle C with energy usage of the appliance during past cycle C−N+1, past cycle C−N+2, . . . and past cycle C−1.

14. The controller of claim 13 wherein the storing means deletes from memory energy usage of the appliance during past cycle C−N.

15. The controller of claim 13 wherein the second estimating means estimates the expected average energy additionally based on (iii) an energy credit for an energy saving feature of the appliance.

16. The controller of claim 15 wherein the storing means deletes from memory energy usage of the appliance during past cycle C−N.

17. The controller of claim 13 wherein the controlling means energizes the appliance when the expected average energy is below the predetermined level.

18. The controller of claim 17 wherein the second estimating means estimates the expected average energy additionally based on (iii) an energy credit for an energy saving feature of the appliance.

19. The controller of claim 11 wherein the second estimating means estimates the expected average energy additionally based on (iii) an energy credit for an energy saving feature of the appliance.

20. A method of controlling an appliance during a current selected cycle C comprising the steps of:

a) estimating expected non-electrical energy to be used by the appliance during the current selected cycle;

b) estimating expected electrical energy to be used by the appliance during the current selected cycle;

c) estimating an expected average energy based on the expected non-electrical energy, the expected electrical energy, and energy substantially related to past selected cycles C−N, C−N+1, . . . C−1;

d) comparing the expected average energy to a predetermined level;

e) controlling the energy usage of the appliance during the current selected cycle responsive to the comparison of the expected average energy to the predetermined level;

f) determining operating non-electrical energy used by the appliance during the current selected cycle;

g) determining operating electrical energy used by the appliance during the current selected cycle;

h) storing an energy amount based upon the operating non-electrical energy and the operating electrical energy with energy amounts related to past selected cycles; and, i) repeating steps a) through h) during a future selected cycle.

21. The method of claim 20 wherein the current selected cycle is designated as cycle C, and wherein the past cycles are past cycle C−N, past cycle C−N+1, past cycle C−N+2, ... and past cycle C−1.

22. The method of claim 21 wherein step h) comprises the step of storing energy usage of the appliance during the current selected cycle C with energy usage of the appliance during past cycle C−N+1, past cycle C−N+2, ... and past cycle C−1.

23. The method of claim 22 wherein step h) comprises the step of deleting from memory energy usage of the appliance during past cycle C−N.

24. The method of claim 22 wherein step c) comprises the step of estimating the expected average energy additionally based on non-electrical energy usage of the appliance during designated past selected cycles, electrical energy usage of the appliance during the designated past selected cycles, and energy credit for an energy saving feature of the appliance.

25. The method of claim 24 wherein step h) comprises the step of deleting from memory energy usage of the appliance during past cycle C−N.

26. The method of claim 22 wherein step d) comprises the step of energizing the appliance when the expected average energy is below the predetermined level.

27. The method of claim 26 wherein step c) comprises the step of estimating the expected average energy additionally based on non-electrical energy usage of the appliance during designated past selected cycles, electrical energy usage of the appliance during the designated past selected cycles, and an energy credit for an energy saving feature of the appliance.

28. The method of claim 20 wherein step c) comprises the step of estimating the expected average energy additionally based on non-electrical energy usage of the appliance during designated past selected cycles, electrical energy usage of the appliance during the designated past selected cycles, and an energy credit for an energy saving feature of the appliance.

* * * * *

UNITED STATES PATENT AND TRADEMARK OFFICE
CERTIFICATE OF CORRECTION

PATENT NO. : 5,883,802
DATED : March 16, 1999
INVENTOR(S) : Robert D. Harris

It is certified that error appears in the above-indentified patent and that said Letters Patent is hereby corrected as shown below:

Title page,

IN THE ABSTRACT item [57],

Line 6  After "average" add --energy--.

Col. 7, line 31, delete "delegated as".

Col. 7, line 32, after "is" delete --current--, and insert --designated as--.

Signed and Sealed this

Twenty-eighth Day of September, 1999

Attest:

Q. TODD DICKINSON

Attesting Officer

Acting Commissioner of Patents and Trademarks